United States Patent
Chung et al.

(10) Patent No.: US 6,177,519 B1
(45) Date of Patent: Jan. 23, 2001

(54) SILANE GRAFTED COPOLYMERS OF AN ISOMONOOLEFIN AND A VINYL AROMATIC MONOMER

(75) Inventors: David Yen-Lung Chung; Hsien-Chang Wang, both of Bellaire, TX (US); Toshio Suzuki, Midland, MI (US); Raymond Lee Tabler, Midland, MI (US); Anil Kumar Saxena, Midland, MI (US)

(73) Assignee: Exxon Chemical Patents, Inc., Baytown, TX (US)

( * ) Notice: Under 35 U.S.C. 154(b), the term of this patent shall be extended for 0 days.

(21) Appl. No.: 09/260,455

(22) Filed: Mar. 2, 1999

(51) Int. Cl.[7] .................................................. C08F 8/20
(52) U.S. Cl. ..................... 525/263; 525/264; 525/265; 525/288
(58) Field of Search .................................. 525/263, 264, 525/265, 288

(56) References Cited

U.S. PATENT DOCUMENTS

| | | |
|---|---|---|
| 3,075,948 | 1/1963 | Santelli . |
| 3,646,155 | 2/1972 | Scott .................................... 260/827 |
| 4,245,060 | 1/1981 | Powers et al. ........................ 525/256 |
| 4,524,187 | 6/1985 | Greco et al. ....................... 525/332.1 |
| 5,162,445 | 11/1992 | Powers et al. ..................... 525/333.4 |
| 5,426,167 | 6/1995 | Powers et al. ......................... 526/347 |
| 5,543,484 | 8/1996 | Chung et al. ...................... 526/347.1 |
| 5,651,927 | 7/1997 | Auda et al. ............................. 264/85 |

FOREIGN PATENT DOCUMENTS

| | | |
|---|---|---|
| 0 004 034 | 9/1979 | (EP) . |
| 0 320 259 | 6/1989 | (EP) . |
| 0 426 073 | 5/1991 | (EP) . |
| 0 560 131 | 9/1993 | (EP) . |
| 0 821 018 | 1/1998 | (EP) . |
| 2030899 | 11/1970 | (FR) . |
| 2293776 | 7/1976 | (FR) . |
| 793 581 | 4/1957 | (GB) . |
| WO 96 11959 | 4/1996 | (WO) . |
| WO 96 40800 | 12/1996 | (WO) . |
| WO 98/28347 | 7/1998 | (WO) . |

*Primary Examiner*—Bernard Lipman
(74) *Attorney, Agent, or Firm*—Brent M. Peebles

(57) ABSTRACT

Curable silylated copolymers based on olefin copolymers comprising at least one $C_4$ to $C_7$ isomonoolefin and a vinyl aromatic monomer (alkyl styrene) are prepared by reacting the olefin copolymer with an olefinically unsaturated hydrolyzable silane in the presence of a free radical generating agent. The silylated copolymers are readily curable by contact with water (moisture) and a silanol condensation catalyst and are particularly useful as the polymeric component in sealant, caulking, adhesive and coating formulations.

26 Claims, No Drawings

SILANE GRAFTED COPOLYMERS OF AN ISOMONOOLEFIN AND A VINYL AROMATIC MONOMER

BACKGROUND OF THE INVENTION

1. Field of the Invention

The invention relates to curable silane-grafted isomonoolefin/vinyl aromatic copolymers particularly useful in sealants, caulks, adhesives and coating compositions.

2. Description of Related Art

Curable copolymers comprising at least one alphamonoolefin and styrene or para-alkylstyrene are known in the prior art. For example, U.S. Pat. No. 5,162,445 discloses curable random copolymers containing a $C_4$ to $C_7$ isomonoolefin, e.g., isobutylene, and para-alkylstyrene, e.g., para-methylstyrene prepared by cationic polymerization of the monomer mixture in the presence of a Lewis acid catalyst, followed by halogenation, e.g., bromination, of the resultant copolymer to introduce benzylic halogen into the polymer molecules. The resultant halogenated copolymer is curable in a variety of ways, including by means of zinc oxide or promoted zinc oxide curing systems normally used to cure halogenated butyl rubber. These halogenated copolymers may also be further functionalized by reaction with a nucleophilic reagent capable of displacing benzylic halogen to provide copolymers containing ester, hydroxyl, carboxy, nitrile, quaternary ammonium, mercapto and other functionality as described in the aforementioned U.S. Pat. No. 5,162,445.

Analogous copolymers prepared by copolymerization of $C_2$ to $C_{12}$ monoolefin, e.g., ethylene or propylene, and para-alkylstyrene, e.g., para-methylstyrene, using a metallocene catalyst, and functionalized derivatives thereof, are disclosed in U.S. Pat. No. 5,543,484.

Copolymers such as described above exhibit many outstanding properties after curing, such as improved resistance to oils and greases, resistance to oxygen and ozone degradation, excellent impermeability to air, water vapor and many organic solvents as well as resistance to aging and sunlight. These properties render these materials, particularly curable elastomeric copolymers where the olefin component comprises at least 50 mole % of $C_4$ to $C_7$ isomonoolefin such as isobutylene, as ideal candidates for applications such as sealants, caulking and coatings. However, in many of these applications, particularly outdoor applications, the material must be in pliable form for use and must be curable in-situ under ambient conditions without the need to apply excessive amounts of heat.

It is known in the prior art that amorphous polyolefins such as copolymers of ethylene and propylene can be rendered cross-linkable by reaction of the polyolefin with a free radical generating compound and an unsaturated hydrolyzable silane, as disclosed in U.S. Pat. No. 3,646,155. However, such materials usually have a relatively high glass transition temperature and are not sufficiently pliable at ambient temperature to serve as polymeric components in sealant or caulking compositions.

Attempts to apply such modification techniques to polyisobutylene-based polymers have not been successful because polyisobutylene-based polymers tend to degrade in the presence of free radical initiators. An attempt to overcome this problem is disclosed in U.S. Pat. No. 4,245,060, which describes silane-functionalized terpolymers of isobutylene, alkylstyrene and a third monomer which is an unsaturated cyclic diene, e.g., cyclopentadiene. In U.S. Pat. No. 4,524,187, copolymers of isobutylene and a triene containing two conjugate double bonds are silylated to provide cross-linkable compositions. In each of these cases, polymer modification takes place by the addition of a silylradical to residual double bonds present in the polymer molecules; however, the presence of residual unsaturation in the polymer molecules severely detracts from the normally good chemical and heat stability of polyisobutylene polymers.

Other methods for introducing silane functionality into binary copolymers of isobutylene and an alkylstyrene are disclosed in U.S Pat. No. 5,426,167, which suggests the reaction of brorninated isobutylene/para-methylstyrene copolymers with an N,N-dimethyl-3-aminopropylsilane. This reaction is a nucleophilic displacement of bromide ion by the tertiary amine and is thus a two-step functionalization process involving both halogenation and nucleophilic displacement reactions.

SUMMARY OF THE INVENTION

The present invention provides a silylated copolymer which is the reaction product of: a) an olefin copolymer comprising at least 50 mole % of at least one $C_4$ to $C_7$ isomonoolefin; b) a silane of the general formula $RR'SiY_2$ wherein R represents a monovalent olefinically unsaturated hydrocarbon or hydrocarbonoxy radical, each Y represents a hydrolyzable organic radical and R' represents an alkyl or aryl radical or a Y radical; and c) a free radical generating agent.

The invention also provides a process for producing a silylated copolymer which comprises the steps of contacting: a) an olefin copolymer comprising at least 50 mole % of at least one $C_4$ to $C_7$ isomonoolefin and at least one vinyl aromatic monomer; and b) a silane of the general formula $RR'SiY_2$ wherein R represents a monovalent olefinically unsaturated hydrocarbon or hydrocarbonoxy radical, each Y represents a hydrolyzable organic radical and R' represents an alkyl or aryl radical or a Y radical; said contact being made in the presence of a free radical generating agent at reaction conditions in a reaction zone.

The silylated copolymers of the invention are readily curable by contact with water (moisture) and a silanol condensation catalyst and are particularly useful as a polymeric component in sealant, caulking, adhesive and coating formulations.

DETAILED DESCRIPTION OF THE INVENTION

The silylated copolymers of the invention may be characterized as the addition product of an olefin copolymer radical created by contact of the copolymer with a free radical generating agent and an olefinically unsaturated, hydrolyzable silane wherein the silane adds to the polymer backbone to produce a silane grafted or silane modified copolymer product.

Olefin copolymers suitable for modification in accordance with this invention comprise copolymers containing at least 50 mole % of at least one $C_4$ to $C_7$ isomonoolefin and from about 0.1 up to 50 mole % of at least one vinyl aromatic monomer. Preferred vinyl aromatic monomers are monovinyl aromatics such as styrene, alpha-methylstyrene, alkyl-substituted styrenes such as t-butylstyrene and para-alkyl substituted styrenes wherein the alkyl group contains from 1 to 4 carbon atoms, more preferably para-methylstyrene. Suitable isomonoolefin monomers include isobutylene and the like. Preferably, 100% of the isomonoolefinic content of the copolymer comprises isobutylene.

Preferred olefin copolymers include elastomeric copolymers comprising isobutylene and para-methylstyrene and containing from about 0.1 to 20 mole % of para-methylstyrene. These copolymers (hereinafter referred to as IPMS) have a substantially homogeneous compositional distribution such that at least 95% by weight of the polymer has a para-methylstyrene content within 10% of the average para-methylstyrene content of the polymer. They are also characterized by a narrow molecular weight distribution (Mw/Mn) of less than about 5, more preferably less than about 3.5, a glass transition temperature ($T_g$) of below about −50° C. and a number average molecular weight (Mn) in the range of about 2,000 to 1,000,000, and even more preferably from 10,000 to 50,000.

These copolymers may be prepared by conventional cationic polymerization of the monomer mixture using a Lewis Acid catalyst and are more particularly disclosed in U.S. Pat. No. 5,162,445, the complete disclosure of which is incorporated herein by reference.

Another class of olefin copolymers which are useful in the present invention are the metallocene-catalyzed copolymers comprising at least one $C_4$ to $C_7$ isomonoolefin and an alkylstyrene, particularly a $C_1$ to $C_4$ para-alkylstyrene and most preferably para-methylstyrene, as disclosed in U.S. Pat. No. 5,543,484, the complete disclosure of which is incorporated herein by reference. These copolymers are prepared by solution polymerization of the monomer mixture in the presence of a metallocene catalyst such as zirconocene or titanocene coordination compounds with single or double cyclopentadienyl derivatives in conjunction with an activating cocatalyst such as a Bronsted acid salt. More preferred of such copolymers are elastomeric copolymers wherein the isomonoolefin content comprises at least 60 mole % of isobutylene. The preferred copolymers have a similar composition, monomer content, $T_g$ and Mn as the IPMS materials described above.

The olefin copolymers useful in the present invention should not contain any significant residual ethylenic unsaturation, e.g., diene, triene or divinyl unsaturation, since the presence of such unsaturation renders these materials more susceptible to chemical degradation such as by oxygen, ozone and/or sunlight. Thus, the copolymers consist essentially of the monoolefin and vinyl aromatic monomers. Also, the terms "alkylstyrene" or "methylstyrene" are not intended to exclude functionalized styrenes which contain benzylic functionality such as halogen, carboxyl, hydroxy and like functionality as disclosed in the aforementioned U.S. Pat. Nos. 5,162,445 and 5,543,484, although the presence of such functionality is not necessary and superfluous for the purposes of the present invention.

Suitable unsaturated organic silanes which are reacted with the olefin copolymer backbone are of the general formula $RR'SiY_2$ wherein R represents a monovalent olefinically unsaturated hydrocarbon or hydrocarbonoxy radical reactive with the free radical sites produced on the backbone polymer, Y represents a hydrolyzable organic radical and R' represents an alkyl or aryl radical or a Y radical. Where R is a hydrocarbonoxy radical, it should be non-hydrolyzable. In the preferred embodiment R may be a vinyl, allyl, butenyl, 4-pentenyl, 5-hexenyl, cyclohexenyl or cyclopentadienyl radical, with vinyl being the most preferred radical. The group Y may be one or a mixture of $C_1$ to $C_4$ alkoxy radical such as methoxy, ethoxy or butoxy; Y may also be selected from acyloxy radicals such as formyloxy, acetoxy or propionoxy; oximo radicals such as —ON=C(CH$_3$)$_2$, —ON=C(CH$_3$)(C$_2$H$_5$) and —ON=C(C$_6$H$_5$)$_2$; or substituted amino radicals such as alkylamino or arylamino radicals, including —NHCH$_3$, —NHC$_2$H$_5$ and —NHC$_6$H$_5$ radicals. The group R' represents either an alkyl group, an aryl group or a Y group. The group R' can be exemplified by a methyl, ethyl, propyl, butyl, phenyl, alkylphenyl group or a Y group. Preferably, R' is a methyl or alkoxy group. The most preferred silanes are those where R' and Y are selected from methyl and alkoxy groups, e.g., vinyltriethoxysilane, vinyltrimethoxysilane and methyl vinyl dimethoxysilane.

Modification of the olefin copolymer backbone is carried out by contact of the copolymer and the unsaturated organic silane in a suitable reaction zone and under reaction conditions in the presence of a free radical generator which may be a chemical compound or radiation.

Suitable free radical initiators include thermally decomposable compounds which generate radicals such as organic peroxides; compounds which generate free radicals by non-thermal methods such as photochemical or redox processes; compounds which have inherent radical character such as molecular oxygen; or electromagnetic radiation such as X-rays, electron beams, visible light or ultraviolet-light.

Suitable organic peroxide compounds include hydroperoxides, dialkyl peroxides, diacyl peroxides, peroxyesters, peroxydicarbonates, peroxyketals, ketone peroxides and organosulfonyl peroxides.

Preferably, the free radical initiator is an organic peroxide compound having a half-life, at the reaction temperature, of less than one tenth of the reaction/residence time employed.

When the free radical initiator is a compound, suitable molar ratio of free radical initiator compound to silane may range from 0.001:1 to 1:1, preferably from about 0.01:1 to about 0.1:1.

Desirably, the molar amount of silane, expressed in mmoles per gram, in the contacting zone may be 1 to 10 times the molar amount of these components as is desired in the final grafted copolymer. Thus, when the molar amount of silane in the grafted copolymer is 0.05 mmoles per gram of product polymer, the amount of silane introduced in the reaction zone is suitably from about 0.05 to about 0.5 mmoles per gram of the total of the copolymer and silane present in the reaction mixture.

The grafting reaction may be conducted in the absence of a diluent or in the presence of a diluent. Where a diluent is present in the reaction zone, suitable diluents include saturated aliphatic hydrocarbons, aromatic hydrocarbons, and perhalogenated hydrocarbons.

The grafting reaction to produce the grafted polymer of the present invention may also be conducted in the absence of a diluent and in the bulk phase, wherein the copolymer is in the molten state. The reaction temperature is chosen to be appropriate for the initiator used.

Suitable reaction conditions include a temperature ranging from about 0° C. to about 300° C. The reaction temperature will vary according to the free radical initiator used. When an organic peroxide is used as an initiator, suitable temperatures range from about 25° to about 250° C. Higher temperatures may be used for other types of free radical initiators. When the reaction is conducted in the presence of a diluent, i.e., solution processes, the reaction temperature will generally be below 150° C. For melt phase processes (i.e., bulk phase processes), the reaction temperature may range from about 25° C., such as in conventional electron beam irradiation equipment to about 250° C., such as in polymer mixing equipment. The process for producing the grafted polymers of the present invention may be conducted as a batch process or as a continuous process.

The reaction is performed in a suitable reaction zone which may be a polymer mixing device such as a Banbury mixer, a single or multiple screw extruder and the like for molten polymers or a glass flask, metal tank or tube when the process is conducted in the presence of a diluent.

Additionally, it may be desirable to reduce the molecular weight of the silylated copolymer of the present invention. This can be accomplished in several ways, including high shear mixing and extruding. Preferably, an extruder is used. More preferably, a twin screw extruder is used.

Extruder breakdown of the polymer can take place at several different steps in the process. The molecular weight breakdown of the olefin copolymer/backbone can be carried out prior to grafting. Also, the molecular weight breakdown of the silylated copolymer can be carried out after the grafting reaction. Finally, the molecular weight breakdown can occur during the grafting reaction. Preferably, the temperature of the reaction zones in the extruder ranges from about 150° C. to about 300° C. An extruder breakdown process which is useful in the present invention is disclosed in U.S. Pat. No. 5,651,927, which is herein incorporated by reference.

After extruder breakdown, the molecular weight of the olefin copolymer/backbone and/or the silylated copolymer preferably ranges from about 5,000 to about 100,000 $M_n$. More preferably, the molecular weight ranges from about 10,000 to about 50,000 $M_n$.

When the molten copolymer itself is the reaction medium, uniform dispersion of the grafting agent and of the initiator is preferably performed by predispersion or by the incorporation of suitable mixing elements into the reactor (e.g., incorporation of mixing screw sections in an extruder). When electromagnetic radiation is used, dispersion of the free radical generator will include uniform exposure of all parts of the olefin copolymer or copolymer solutions to the beam.

Preferably the grafting reaction is conducted such that the resulting silylated copolymers contain an average of from about 0.5 to about 15, more preferably from about 1 to about 5 moles of hydrolyzable silyl groups per molecular chain, as measured by $^1$HNMR.

As indicated above, it is most surprising that the olefin copolymers, particularly isobutylene-based copolymers, can be grafted by the free radical mechanisms disclosed without substantial degradation of the polymer backbone. It is believed that the process leads to selective silylation primarily at the benzylic hydrogen sites around the copolymerized vinyl aromatic monomers which are dispersed randomly along the polymer chain.

The silylated copolymers of the present invention may be cured by contact with or mixing with water (moisture), preferably in the presence of a silanol condensation catalyst. Suitable catalysts include metal carboxylates such as dibutyltin dilaurate, stannous octoate, stannous acetate, lead naphthenate and zinc octoate; organic metal compounds such as titanium esters and chelates such as tetrabutyl titanate; organic bases such as ethylamine, hexylamine and piperidine; and acids such as mineral acids and fatty acids. Preferred catalysts are organic tin compounds such as dibutyltin dilaurate and stannous octoate. The amount of catalyst employed will generally range from about 0.1 to 10 parts by weight per 100 parts by weight of silylated copolymer.

The silylated copolymers of the invention are ideally suited for use in sealant, adhesive, caulking and coating compositions. Such compositions may also contain other conventional additives such as fillers, plasticizers, extender oils, colorants, antioxidants, other polymers and like additives as are known in the art. The compositions may be packaged in single anhydrous packages or in two-package systems, one containing an anhydrous composition based on the silylated copolymer and a second package containing a composition containing the catalyst and water which packages are adapted to be mixed prior to application and the resulting composition cured in-situ after application.

The following examples are illustrative of the invention.

Synthesis of Isobutylene/p-methylstyrene Copolymers

EXAMPLE A

The isobutylene/p-methylstyrene (PMS) copolymers were prepared by the following general procedure:

A continuous 1-gal reactor fitted with injection ports for monomers and catalyst/co-catalyst, mechanical stir, overflow line and cooling system was used to synthesize isobutylene/PMS copolymers. The average rector operation conditions for making isobutylene/PMS copolymers with 5,000–25,000 Mn, 5–10 mole % PMS are the following:

Monomer feed blend ~54 wt % isobutylene, 14 wt % PMS, 32 wt % hexane p-methylstyrene/isobutylene ratio ~20/80

Monomer feed flow rate ~66 g/min

Monomers concentration in total feeds to reactor ~45 wt % (in hexane)

EADC catalyst feed concentration ~0.35 wt % (in hexane)

EADC catalyst feed flow rate ~18 g/min isobutylene/EADC weight ratio ~575 t-Butyl chloride co-catalyst feed concentration ~600 ppm t-Butyl chloride co-catalyst feed flow rate ~15 g/min isobutylene/t-butyl chloride weight ratio ~6500

Reactor temperature=40° C. to −10° C.

Monomer conversion ~85–95%

The polymerization process was closely monitored and controlled by a standard pilot plant process control computer system. Small samples were withdrawn from the reactor periodically for monitoring the polymer molecular weight and conversion. The flow rates and reactor temperature were adjusted if necessary based on the real time polymer MW and conversion data. During the run, the reaction mixture continuously flowed into a vessel containing methanol/caustic mixture as quenching agent with agitation. The top layer quenched polymer solution was periodically drained into sample drums for subsequent washing and stripping. The polymer solution samples were then combined, thoroughly mixed and washed with water until neutral in a 50-gal batch reactor. The hexane in the washed polymer solution was subsequently stripped either in a rotary evaporator or in a thin-film evaporator. The dried polymer samples were then characterized by GPC and NMR.

Three low molecular weight isobutylene/p-methylstyrene copolymers were made via the general reaction conditions and the characterization results of the composite polymer sample of each polymerization run are shown in Table 1.

TABLE 1

|  | I | II | III |
|---|---|---|---|
| Conversion %, | ~88% | ~90% | ~95% |
| Mole % PMS | 6.5 | 8.5 | 9.5 |
| Mn | 14K | 9K | 20K |
| Mw | 35K | 25K | 46K |
| Mw/Mn | 2.5 | 2.8 | 2.3 |

LM Isobutylene-PMS Copolymer via Extruder Breakdown

EAXMPLE B

Although isobutylene/para-methylstyrene copolymers are much more resistant to MW breakdown than polyisobutylenes, Low Molecular Weight(LM) isobutylene-para-methylstyrene (PMS) copolymers can alternatively be made from high molecular weight copolymer via extruder breakdown process using organic peroxide as catalyst. In this example, high molecular weight (Mn ~174K, Mw/Mn ~2.2) isobutylene/PMS copolymer containing 5 wt % PMS was cut into small pieces in a Rietz chopper and fed into a drying extruder at 150–160° C. at about one ton per hour rate and the extrudate was fed directly into a 4.5" Welding Engineering counter-rotating, nonintermeshing twin-screw reactive extruder. The speed of the reactive extruder was between 80–150 rpm and the polymer feed zone temperature was about 180° C. Di-t-butyl peroxide (50 wt % Luperox 101 in Marcol 52 mineral oil) was injected into the reactive extruder upstream from the reaction zone at a rate that equal to 0.75–1.3 wt % peroxide based on polymer feed rate. The reaction zone temperature was maintained at about 220–250° C. A slight vacuum was applied to the vent zone downstream from the reaction zone to remove volatile peroxide decomposition by-products. The resulting polymer (Mn ~71 K, MWD ~2.5) was cooled to 180° C. before discharging into sample drums for subsequent grafting experiments.

Synthesis of Isobutylene/Styrene Copolymer

EXAMPLE C

An isobutylene/styrene copolymer was prepared via typical carbocationic polymerization conditions in 60/40 hexane/methyl chloride mixed solvent inside a nitrogen atmosphere chamber (dry box) equipped with a cooling bath and stirs. In this copolymerization experiment, 24 g of isobutylene, 4.5 g styrene (Aldrich, 99% with inhibitor removed prior to use), 99.7 g of hexane (Fisher, 99.9%, dried over sodium metal and benzophenone prior to use) and 68.6$_7$ g methyl chloride (Air Products, 97%, dried over calcium chloride)were placed in a 500 cc reaction flask which is then cooled down to −39° C. in the cooling bath.

A catalyst solution was prepared by mixing 116 mg of ethyl aluminum dichloride (EADC) and 84 mg t-butyl chloride in 100 g methylene chloride (Aldrich, 99.8%, anhydrous) and cooled down to −39° in the cooling bath prior to use.

After both the monomer solution and the catalyst solution reached the target polymerization temperature (−39° C.), 5 cc aliquots of the catalyst solution were added into the reaction mixture step wise with vigorous agitation. The rate of catalyst solution addition was controlled so that the temperature of the polymerization mixture was no greater than 10° C. After 50 cc of catalyst solution was added, the reaction was quenched with neat methanol. The resulting polymer was washed, precipitated and dried for characterization. The results are shown as the following:

| Conversion % | 44% |
|---|---|
| Mole % Styrene in Polymer | 12.4% |
| Mn | 30,900 |
| Mw | 80,100 |
| Mw/Mn | 2.6 |

GRAFTING REACTIONS

COMPARATIVE EXAMPLE

This Example illustrates that polyisobutylene homopolymers degrade readily but can not be successfully grafted by processes in accordance with this invention.

A sample of Exxon's polyisobutylene polymer (VISTANEX™ LM-MS-LC, Mn=18,000; Mw/Mn=3.24–100 gm) was placed in a resin kettle fitted with a water condenser, nitrogen inlet, and a mechanical stirrer. The polymer was heated to 70° C. $CH_2$=CHSi $(OCH_3)_3$(10 gm) and 0.6 gm of VAROX-130 (2,5-dimethyl-2,5-di(t-butylperoxy)hexyne-3 (90%), commercially available from the Vanderbilt Company) were added to the kettle. The kettle was purged with dry nitrogen. The contents were heated at 200° C. for 1–2 hours. The contents were cooled to 100° C. and Varox-130 (0.5 gm) was added. The contents were heated at 200° C. for another 1 hour. The volatiles and excess reagents were removed at 90° C. under vacuum for 2 hours. The GPC data (Mn=3,450; Mw/Mn=3.08) showed that severe degradation of the polymer had taken place. The $^{29}$Si NMR showed that no grafting had taken place.

Grafting of Vinyisilane onto IB/IPMS Copolymer in Solution

EXAMPLE 1

A copolymer of isobutylene and PMS (Mn=14,900, 10 mole % PMS, 25 grams), synthesized according to Example A, was dissolved in 10 ml of xylene. The solution was placed in a resin kettle fitted with a condenser, thermometer, mechanical stirrer, and a nitrogen inlet. $H_2C$=CHSi$(OCH_3)_3$(5 grams) and t-butyl peroxide (0.1 grams) were added to the flask. The contents were stirred and heated at 120° C. for 38 hours. The volatiles and excess reagents were removed at 90° C. under vacuum for 16 hours. A yellow polymer was obtained. The polymer was analyzed by $^1$H and $^{29}$Si NMR and GPC (Mn=16,100, Mw/Mn=2.27). The $^1$H NMR showed that the resulting polymer contains 2.9 units of trimethoxysilyl groups per chain on average. The r esulting polymer (5 grams) was mixed with 0.15 grams of stannous octoate and 0.05 grams of water and was allowed to stand at room temperature for 6 hours. The mixture cured into a useful elastomeric material.

EXAMPLE 2

The polyisobutylene/PMS copolymer # I from Example A (200 gm) was placed in a Haake Rheocord mixer fitted with roller blades. The polymer was softened by applying shear. The blades were rotated at 200 RPM. A mixture of $CH_2$=CHSi $(OCH_3)_3$(30 gm) and dicumyl peroxide (8 gm) was slowly added to the polymer via a syringe. The contents were mixed at 90–100° C. for 30 minutes and heated at 185°

C. for another 30 minutes. The volatiles and excess reagents were removed at 80° C. under vacuum for 16 hours. A pale yellow polymer was obtained. GPC (Mn=13,300; Mw/Mn=15.75). The 'H NMR showed that 2.5 mole % of silane monomer group was grafted onto the polymer.

EXAMPLE 3

The polyisobutylene/PMS copolymer II from Example A (1000 gm) was placed in a IKA LR 2000 P (IKA Works, Germany) mixer fitted with a wiping blade and UltraTurrax dispersing shaft. The polymer was heated to 180° C. The blades were rotated at 60 RPM and the dispersing shaft was engaged at 8000 RPM. A mixture of $CH_2=CHSi(CH_3)(OCH_3)_2$(100 gm) and dicumyl peroxide (30 gm) was added to the polymer via a stainless steel tube under a positive nitrogen pressure. The contents were mixed at 180° C. for 30 minutes. The volatiles and excess reagents were removed at 80° C. under vacuum for 16 hours. A pale yellow polymer was obtained. GPC (Mn=9900, Mw/Mn=4.5). The 'H NMR showed that 2 mole % of silane monomer group was grafted onto the polymer.

Sealant Formulation and Testing

The polymer obtained above was used in a sealant formulation. A $CaCO_3$ and silica filled formulation (polymer 31.3%, KP-32 (paraffin oil, Apollo America Corp.) 31.3%, Methyltrimethoxysilane 0.9%, Winofil SPM (calcium carbonate, Zeneca Resins) 31.3%, HDK 2000 ($Me_3Si$ treated silica, Wacker Chemie) 3.1%, dibutyltin bis(2,4-pentanedionate) 1.9%) was prepared in a whip mixer. The Tack Free Time was 74 minutes. The physical properties after 1 week were 121% elongation, 82 psi tensile strength and 20 Shore A hardness. 66% gel content was achieved after cure.

EXAMPLE 4

The polyisobutylene/PMS copolymer III from Example A (10 Kg) was pumped to a Twin Screw Extruder. The polymer was softened by applying heat. A mixture of $CH_2=CHSi(CH_3)(OCH_3)_2$(1 Kg) and dicumyl peroxide (300 gm) were slowly added to the polymer by a pump so as to maintain a polymer/silane/peroxide ratio of 100:10:3. The contents were mixed in the extruder at 180–185° C. with about 2 minutes residence time. The volatiles and excess reagents were removed at 120° C. under vacuum. Mn=23,500; MWD=3.56. The 'H NMR showed that 1.3 mole % of silane monomer group was grafted on the polymer. 70% gel content was achieved after cure. The resulting polymer (10.77 gm) was mixed with 2.03 gm of KP-100 (paraffin oil, Apollo America Corp.) and 0.4 gm of stannous octoate and was allowed to stand at room temperature for 24 hours. The mixture cured into a useful elastomeric material.

EXAMPLE 5

The polyisobutylene/PMS copolymer from Example B, 10 Kg, was pumped to a Twin Screw Extruder. The polymer was softened by applying heat. A mixture of $CH_2=CHSi(CH_3)(OCH_3)_2$(1 Kg) and dicumyl peroxide (300 gm) were slowly added to the polymer by a pump so as to maintain a ratio of 100:10:3. The contents were passed at 180–185° C. for about 2 minutes. The volatiles and excess reagents were removed at 120° C. under vacuum. 10 grams of resulting polymer (Mn=32,100; MWD=2.95) was mixed with 2 gm of KP-100 (paraffin oil, Apollo America Corp.) and 0.35 gm of stannous octoate and was allowed to stand at room temperature for 24 hours. The mixture cured into a useful elastomeric material.

Sealant Formulation and Testing

The polymer obtained above was used in a sealant formulation. A $CaCO_3$ filled formulation (polymer 27.7%, KP-32 (paraffin oil, Apollo America Corp.) 27.7%, Methyltrimethoxysilane 0.6%, Winofil SPM (calcium carbonate, Zeneca Resins) 41.6%, dibutyltin bis(2,4-pentanedionate) 0.8%) was prepared in a whip mixer. The Tack Free Time was 155 minutes. The cure product (after 1 week cure) showed 375% elongation, 121 psi tensile strength and 15 Shore A hardness. 80% gel content was achieved after cure.

Grafting of Vinyltrimethoxysilane onto IB/styrene Copolymers

EXAMPLE 6

The polyisobutylene-styrene copolymer from Example C (22 gm), was placed in a Haake Rheocord mixer fitted with roller blades. The copolymer was softened by applying shear. The blades were rotated at 200 RPM. A mixture of $CH_2=CHSi(CH_3)(OCH_3)_2$(3.3 gm) and dicumyl peroxide (0.66 gm) was slowly added to the copolymer by a syringe. The contents were mixed at 80° C. for 5 minutes and heated at 180° C. for another 10 minutes. The volatiles and excess reagents were removed at 80° C. under vacuum for 16 hours. An off white polymer was obtained.

The 'HNMR showed that the resulting copolymer contains 2.7 units of silane monomer groups per chain on average. The resulting grafted copolymer (10 gm) was mixed with 2 gm of KP100 and 0.35 gm of stannous octoate and was allowed to stand at room temperature for 24 hours. The mixture cured into a useful elastomeric material.

What is claimed is:

1. A silylated copolymer which is the reaction product of:
   a) an olefin copolymer comprising at least 50 mole % of at least one $C_4$ to $C_7$ isomonoolefin and at least one vinyl aromatic monomer;
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; and
   c) a free radical generating agent.

2. The silylated copolymer of claim 1 wherein said olefin copolymer comprises at least 60 mole % of at least one $C_4$ to $C_7$ isomonoolefin.

3. The silylated copolymer of claim 1 wherein said vinyl aromatic monomer is an alkylstyrene.

4. The silylated copolymer of claim 3 wherein said alkyl styrene comprises para-methylstyrene.

5. The silylated copolymer of claim 3 comprising at least 80 mole % of isobutylene and from about 0.1 up to 20 mole % of para-alkylstyrene.

6. The silylated copolymer of claim 1 wherein said silane is a vinyl trialkoxy silane or methylvinyldialkoxy silane wherein the alkoxy group contains 1 to 4 carbon atoms.

7. The silylated copolymer of claim 1 wherein said free radical generating agent is an organic peroxide.

8. The silylated copolymer of claim 1 wherein said olefin copolymer has a number average molecular weight in the range of about 2,000 to 1,000,000.

9. The silylated copolymer of claim 8 wherein the number average molecular weight of said olefin copolymer is in the range of about 5,000 to 100,000.

10. The silylated copolymer of claim 9 wherein the number average molecular weight of said olefin copolymer is in the range of about 10,000 to 50,000.

11. The silylated copolymer of claim 1 wherein said olefin copolymer contains an average of from about 0.5 to about 15 moles of silyl groups per molecular chain, as measured by $^1$H NMR.

12. The silylated copolymer of claim 11 containing an average of from about 1 to about 5 moles of silyl groups per molecular chain.

13. A process for producing a silylated copolymer which comprises the steps of contacting:
   a) an olefin copolymer comprising at least 50 mole % of at least one $C_4$ to $C_7$ isomonoolefin and at least one vinyl aromatic monomer; and
   b) a silane of the general formula $RR'SiY_2$ wherein R represents a monovalent olefinically unsaturated hydrocarbon or hydrocarbonoxy radical, each Y represents a hydrolyzable organic radical and R' represents an alkyl radical, an aryl radical or a Y radical; said contact being made in the presence of a free radical generating agent at reaction conditions in a reaction zone.

14. The process of claim 13 wherein said vinyl aromatic monomer is an alkylstyrene.

15. The process of claim 14 wherein said olefin copolymer comprises at least 80 mole % isobutylene and from about 0.1 up to 20 mole % of para-alkylstyrene.

16. The process of claim 13 wherein said free radical generating agent is an organic peroxide, present at a molar ratio to said about 0.01:1 to silane of from about 0.1:1.

17. The process of claim 13 wherein said silane is present in the reaction mixture at a level of from about 0.05 to about 0.5 mmoles per gram of olefin copolymer plus silane.

18. The process of claim 13 wherein said contact step is conducted in the absence of a diluent and wherein said olefin copolymer is in the molten state.

19. The process of claim 13 wherein said contact step is conducted in the presence of a diluent.

20. The process of claim 13 wherein said silane is present in said reaction zone at a level such that said silylated copolymer contains an average of from about 0.5 to about 15 moles of silyl groups per molecular chain, as measured by $^1$H NMR.

21. A cured silylated copolymer of claim 1 prepared by contacting said silylated copolymer with water in the presence of a silanol condensation catalyst.

22. The process of claim 13 wherein the molecular weight of said olefin copolymer is reduced prior to contact with said silane.

23. The process of claim 22 wherein the molecular weight of said olefin copolymer is reduced using an extruder.

24. The process of claim 13 further comprising reducing the molecular weight of said silylated copolymer after contacting said olefin copolymer with said silane.

25. The process of claim 24 wherein the molecular weight of said silylated copolymer is reduced using an extruder.

26. The process of claim 13 wherein said olefin copolymer is contacted with said silane in an extruder.

* * * * *